E. SCHNEIDER.
MOTION PICTURE APPARATUS.
APPLICATION FILED FEB. 23, 1918.

1,368,763.

Patented Feb. 15, 1921.
2 SHEETS—SHEET 1.

INVENTOR
Eberhard Schneider
BY
ATTORNEY

E. SCHNEIDER.
MOTION PICTURE APPARATUS.
APPLICATION FILED FEB. 23, 1918.

1,368,763.

Patented Feb. 15, 1921.
2 SHEETS—SHEET 2.

INVENTOR
Eberhard Schneider
BY
ATTORNEY

UNITED STATES PATENT OFFICE.

EBERHARD SCHNEIDER, OF NEW YORK, N. Y.; STANISLAWA SCHNEIDER ADMINISTRATRIX OF SAID EBERHARD SCHNEIDER, DECEASED.

MOTION-PICTURE APPARATUS.

1,368,763. Specification of Letters Patent. Patented Feb. 15, 1921.

Application filed February 23, 1918. Serial No. 218,664.

*To all whom it may concern:*

Be it known that I, EBERHARD SCHNEIDER, a citizen of the United States, and a resident of New York, in the county of New York and State of New York, have invented certain new and useful Improvements in Motion-Picture Apparatus, of which the following is a specification.

The invention relates to improvements in motion picture apparatus, such as cameras, printers and projectors, and more particularly to the mechanism thereof for intermittently advancing the film. It has for its object a novel film-advancing mechanism, as well as means for properly registering or "framing" the picture of the film with reference to the aperture of the motion picture apparatus, and more especially to film-advancing mechanism employing suitable claws or like members to draw the film past the aperture.

In the accompanying drawings, which illustrate the invention—

Similar characters of reference designate corresponding parts throughout the several views.

Figure 1:
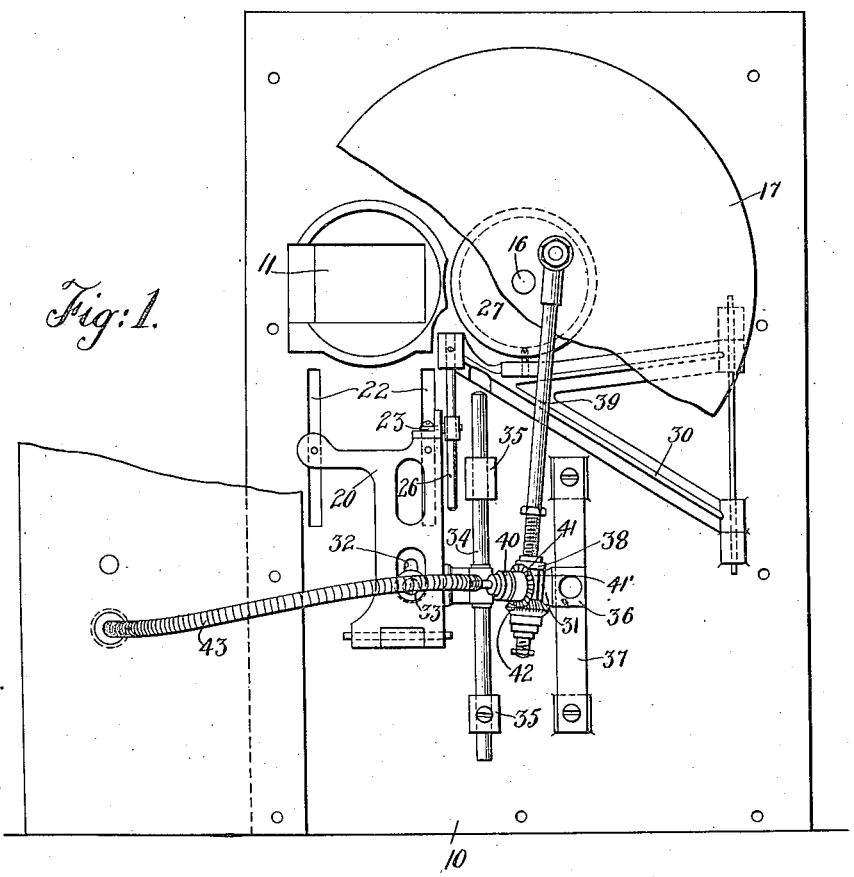
Figure 1 is a rear elevation of the film-advancing and framing mechanism.
Figure 3:
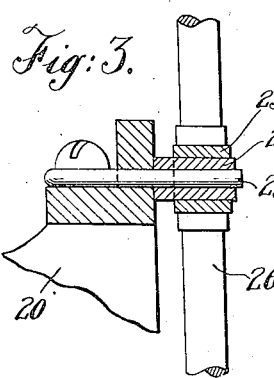
Fig. 3 is a detail sectional view of a flexible bearing.
Figures 4, 5:
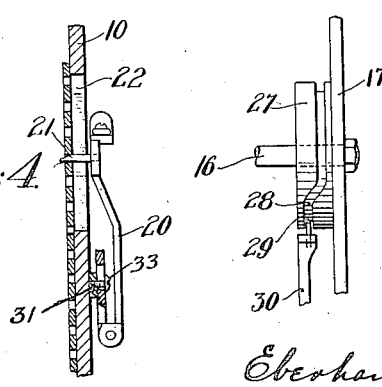
Figs. 4 and 5 are detail views illustrating respectively the means for engaging the film and the releasing means therefor.
Figure 2:
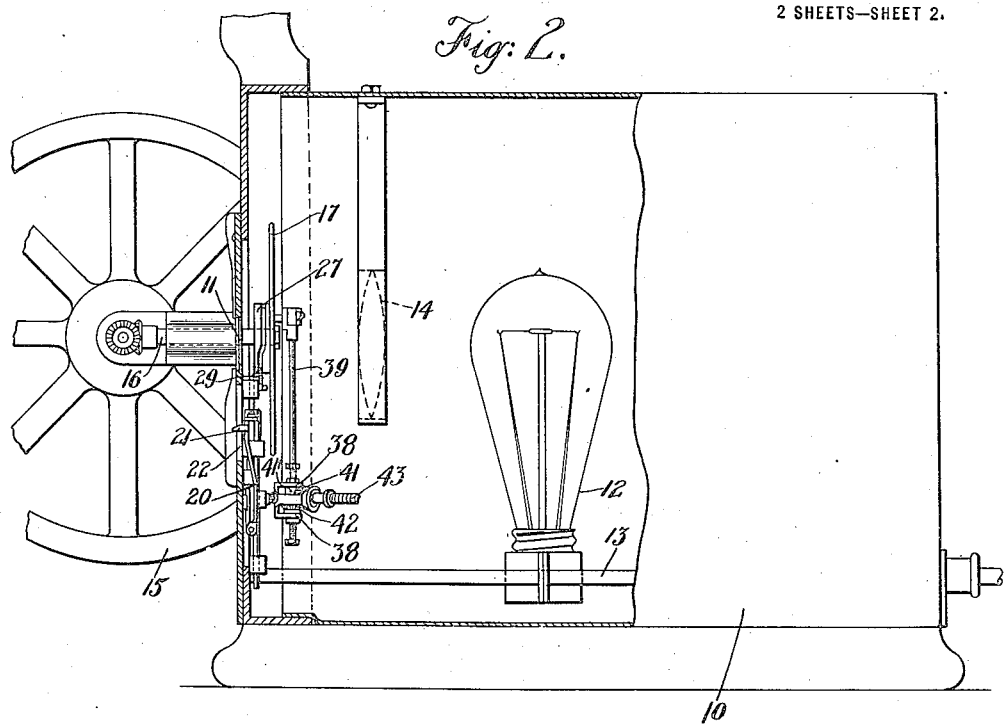
Fig. 2 is a side elevation of the apparatus, on a reduced scale, with a portion of the casing broken away.
Figure 6:
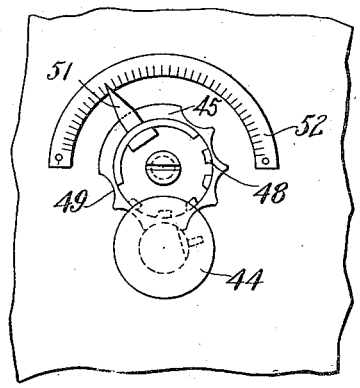
Figs. 6 and 7 are respectively a front elevation and a sectional view of an indicator and manual operating means for effecting the framing of the picture.
Figure 7:
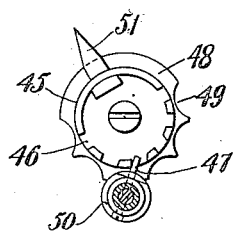

Referring to the drawings, 10 designates a suitable container or casing for the mechanism, the front wall of which is provided with an aperture 11 through which the picture is taken, printed or projected in well-known manner, and past which the film is drawn in manner hereinafter set forth. Light for these purposes is obtained from a source of illumination, for example, an incandescent lamp 12 which is adjustable along a rod 13 at the base of the cabinet, and the rays of which may be passed through a condensing lens 14 secured to the cabinet.

Motion for operating the mechanism, hereinafter described, is obtained from a driving wheel 15, which through intermediate gearing is designed to rotate the shaft 16 which is suitably mounted in the casing wall. On this shaft and movable therewith is a shutter 17 timed to move past the aperture 11 in accordance with the movement of the film, as is well understood.

To effect the motion of the film past this aperture in proper relationship to the shutter movement, a traveler frame 20 is pivotally secured, indirectly, to the casing wall to rock backwardly therefrom, and carries two claws or fingers 21 which project through corresponding vertical slots 22 of the said casing wall to engage the perforations of the film. This frame has secured thereto at its upper end, a laterally extending shaft 23 which is slidable in a bearing 24 rotatably mounted in a block 25 which, in turn, is rotatable and reciprocable on a guiding rod 26 movably supported as hereinafter set forth. In this manner, the said frame is positively guided in its vertical motion and may rock backwardly under the influence of a cam member 27. This member is in the nature of a cylinder rotatable with the shaft 16 and has a peripheral cam groove 28 in which fits a pin and ball 29 of a frame member or arm 30 which is hingedly secured to the casing wall, and in which arm the rod 26 is adapted to slide.

In order to effect the reciprocatory motion of the traveler frame 20, the same is not secured directly to the casing wall, but to a second laterally extending arm or cross-head 31 with respect to which, and therefore also to the aperture 11, it may be adjusted as through slot 32 therein, and a screw 33 passing through said slot into the arm 31. The latter is attached to a vertically extending rod 34 adapted to slide in suitable guides 35 and terminates, at its free end, in ways 36 slidable upon a bar 37. To the arm or cross-head 31 is attached a bracket having oppositely-disposed arms 38 through which freely passes the threaded end of a connecting rod 39 whose other end is eccentrically secured to the cylinder 27, and rotated thereby to effect the reciprocation of the cross-head and thereby of the traveler frame member 20 in synchronism with the rotation of the shutter 17. As shown, the claws will engage the perforations of the film at the upper end of the motion of frame 20 and draw the same downwardly during the downward movement thereof; whereupon, the claws are released through the action of the cam 27, and the frame reciprocated to its extreme upward position when the cam again effects the engagement of the claws with the perforations of the film.

It frequently occurs that, owing to patched films or the varying positioning of pictures with reference to the perforations of the film, a said picture will not register accurately with the aperture 11, and means are, therefore, necessary to change the position of the claws with reference to the said film aperture during operation. To this end, the bracket carries a further arm 40 at right angles to the arms 31, and in which is rotatably mounted a miter gear 41 engaging a similar gear 42 which has an extension or bushing 41' mounted over the threaded end of rod 39 between the said two arms 31 and contacting therewith. This bushing is internally threaded for engagement with the rod 39, which works through same and thereby causes the said bracket to move along the rod. By rotating the gear 41, in one direction or the other, the bracket will be correspondingly moved and the effective length of the connecting rod altered accordingly. In this manner, the position of frame 20, with reference to the eccentric, is adjusted relatively to the aperture and the picture properly framed. To render the gear 41 conveniently accessible for operation, the same is connected through a flexible shaft 43 to the outside of the casing 10, said shaft terminating in a milled head 44, which is rotatably secured to said casing and serves to correspondingly rotate said shaft, and through same to effect the lengthening or shortening of the connecting rod 39. To insure a positive and predetermined adjustment, a cylindrical member 45 is rotatably mounted in the casing 10 adjacent the member 44, and has formed therein equidistantly-spaced notches 46 into which is adapted to fit a pin 47 extending from the head 44, which in making one complete turn, advances the said cylinder one notch. To positively locate or lock and hold the cylinder and bracket against vibration, in thus centering or framing the picture, the same is provided with a flange 48 having circumferential semicircular recesses 49 which are designed to engage the shank 50 of the head 44. An indicator 51, furthermore, is secured to the cylinder 45 and moves over a suitably graduated scale 52 secured to the casing, whereby the extent of adjustment, that is to say, the position of the traveler frame 20, may be conveniently shown.

The method of imparting movement, necessary to effect the film-advancing mechanism for purpose of framing, through a flexible connection, such as the flexible shaft 43, may, of course, be readily adapted to types of film-advancing mechanism other than that herein disclosed; and the invention is, therefore, not to be construed as restricted to same.

I claim:

1. In motion picture apparatus: film-advancing mechanism embodying a traveler having claws designed to engage the perforations of the film; a reciprocable member to which said traveler is pivotally connected; a cam member adapted to actuate said traveler to rock the same and effect the disengagement and engagement of the claws with the perforations of the film; and a rod connecting said cam with said reciprocable member to effect the reciprocation of said traveler.

2. In motion picture apparatus: film-advancing mechanism embodying a traveler having claws designed to engage the perforations of the film; a reciprocable member to which said traveler is pivotally connected; a cam member adapted to actuate said traveler to rock the same and effect the disengagement and engagement of the claws with the perforations of the film; and an adjustable rod connecting said cam with said reciprocable member to effect the reciprocation of said traveler.

3. In motion picture apparatus: film-advancing mechanism embodying a traveler having claws designed to engage the perforations of the film; a reciprocable member to which said traveler is pivotally connected; cam member adapted to actuate said traveler to rock the same and effect the disengagement and engagement of the claws with the perforations of the film; a rod connecting said cam with said reciprocable member to effect the reciprocation of said traveler; and an arm extending laterally from the traveler, a bearing therefor in which the arm is slidable, and an oscillatory block guided for movement at right angles to said arm and in which said bearing is rotatable, said block being oscillated through the action of said cam member.

4. In motion picture apparatus: film-advancing mechanism embodying a casing, a traveler having claws designed to engage the perforations of the film; a reciprocable member to which said traveler is pivotally connected; a cam member adapted to actuate said traveler to rock the same and effect the disengagement and engagement of the claws with the perforations of the film; a rod connecting said cam with said reciprocable member to effect the reciprocation of said traveler; an arm extending laterally from the traveler, a bearing therefor in which the arm is slidable, an oscillatory block guided for movement at right angles to said arm and in which said bearing is rotatable, and a guide rod for said block; and an arm pivotally secured to the casing, carrying said block and having means adapted to be engaged by said cam to swing said arm and thereby effect the rocking of said traveler.

5. In motion picture apparatus: film-advancing mechanism embodying a traveler having claws designed to engage the perforations of the film; a reciprocable member to which said traveler is pivotally connected; a cam member adapted to actuate said traveler to rock the same and effect the disengagement and engagement of the claws with the perforations of the film; a connecting rod threaded at one end and secured at the other end to said cam member; a rotatable bushing in connection with the traveler, internally threaded and through which the threaded end of the connecting rod works; and means to rotate said bushing.

6. In motion picture apparatus: film-advancing mechanism embodying a traveler having claws designed to engage the perforations of the film; a reciprocable member to which said traveler is pivotally connected; a cam member adapted to actuate said traveler to rock the same and effect the disengagement and engagement of the claws with the perforations of the film; a connecting rod threaded at one end and secured at the other end to said cam member; a rotatable bushing in connection with the traveler, internally threaded and through which the threaded end of the connecting rod works; and means, including a flexible connection, to rotate said bushing.

7. In motion picture apparatus: a film-advancing element; means to actuate same; means to adjust said actuating means to alter the position of said film-advancing element with reference to the perforations of the film, and including a flexible shaft accessible for manual operation; means to effect the rotation of said flexible shaft; and means to positively determine the extent of rotation of said flexible shaft.

8. In motion picture apparatus: a film-advancing element; means to actuate same; means to adjust said actuating means to alter the position of said film-advancing element with reference to the perforations of the film, and including a flexible shaft accessible for manual operation; means to effect the rotation of said flexible shaft and means to lock said flexible shaft.

9. In motion picture apparatus: a film-advancing element; means to actuate same; means to adjust said actuating means to alter the position of said film-advancing element with reference to the perforations of the film, and including a flexible shaft terminating in a rotatably mounted head, and a cylindrical member rotatably mounted, and provided with a plurality of equidistantly spaced notches adapted to receive a pin extending from the head of the flexible shaft to rotate the said cylindrical member one step for each complete rotation of the said head.

10. In motion picture apparatus: a film-advancing element; means to actuate same; means to adjust said actuating means to alter the position of said film-advancing element with reference to the perforations of the film, and including a flexible shaft terminating in a rotatably mounted head, and a cylindrical member rotatably mounted and provided with a plurality of equidistantly spaced notches adapted to receive a pin extending from the head of the flexible shaft to rotate the said cylindrical member one step for each complete rotation of the said head, said cylindrical member being provided also with a flange having circumferential semi-circular recesses for engagement with the shank of the head.

11. In motion picture apparatus: a film-advancing element; means to actuate same; means to adjust said actuating means to alter the position of said film-advancing element with reference to the perforations of the film, and including a flexible shaft terminating in a rotatably mounted head, and a cylindrical member rotatably mounted, and provided with a plurality of equidistantly spaced notches adapted to receive a pin extending from the head of the flexible shaft to rotate the said cylindrical member one step for each complete rotation of the said head; and indicating means carried by said cylinder.

Signed at New York in the county of New York and State of New York this 19th day of February, A. D. 1918.

EBERHARD SCHNEIDER.